(12) United States Patent
Xiao et al.

(10) Patent No.: US 12,363,744 B2
(45) Date of Patent: Jul. 15, 2025

(54) RESOURCE INDICATION METHOD AND APPARATUS, AND SERVICE NODE AND STORAGE MEDIUM

(71) Applicant: ZTE CORPORATION, Guangdong (CN)

(72) Inventors: Kai Xiao, Guangdong (CN); Xing Liu, Guangdong (CN); Jing Shi, Guangdong (CN); Peng Hao, Guangdong (CN); Xianghui Han, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 500 days.

(21) Appl. No.: 17/632,847

(22) PCT Filed: Jul. 23, 2020

(86) PCT No.: PCT/CN2020/103706
§ 371 (c)(1),
(2) Date: Feb. 4, 2022

(87) PCT Pub. No.: WO2021/023015
PCT Pub. Date: Feb. 11, 2021

(65) Prior Publication Data
US 2022/0295493 A1    Sep. 15, 2022

(30) Foreign Application Priority Data
Aug. 6, 2019   (CN) .......................... 201910722772.9

(51) Int. Cl.
*H04W 72/04*    (2023.01)
*H04L 5/00*    (2006.01)
(Continued)

(52) U.S. Cl.
CPC ....... *H04W 72/53* (2023.01); *H04W 72/0446* (2013.01); *H04W 72/0453* (2013.01); *H04W 72/23* (2023.01)

(58) Field of Classification Search
CPC ............. H04W 72/53; H04W 72/0446; H04W 72/0453; H04W 72/23; H04W 72/1268; H04W 72/21
See application file for complete search history.

(56) References Cited

U.S. PATENT DOCUMENTS 11,190,322 B2 * 11/2021 Myung ................. H04L 5/0007
11,316,623 B2 * 4/2022 Lyu ....................... H04L 1/0018
(Continued)

FOREIGN PATENT DOCUMENTS

CN    107241288 A    10/2017
CN    108024363 A    5/2018
(Continued)

OTHER PUBLICATIONS

International Search Report for PCT/CN2020/103706, mailed Oct. 28, 2020.
(Continued)

*Primary Examiner* — Schquita D Goodwin
(74) *Attorney, Agent, or Firm* — KDW FIRM PLLC

(57) ABSTRACT

Provided are a resource indication method and apparatus, a serving node and a storage medium. The resource indication method includes: sending first resource indication information to a user terminal, where the first resource indication information is used for indicating an uplink data transmission mechanism to the user terminal; and receiving uplink data sent by the user terminal.

16 Claims, 5 Drawing Sheets

(51) Int. Cl.
*H04W 72/0446* (2023.01)
*H04W 72/0453* (2023.01)
*H04W 72/23* (2023.01)
*H04W 72/53* (2023.01)

(56) References Cited

U.S. PATENT DOCUMENTS

| | | | | |
|---|---|---|---|---|
| 2017/0079085 A1* | 3/2017 | Yang | ...................... | H04W 76/14 |
| 2017/0367087 A1* | 12/2017 | Seo | ...................... | H04W 72/51 |
| 2019/0268930 A1* | 8/2019 | Rudolf | ................. | H04L 5/0094 |
| 2020/0128515 A1* | 4/2020 | Lin | ........................ | H04L 5/0094 |
| 2020/0213984 A1* | 7/2020 | Hwang | ................. | H04L 5/0053 |
| 2020/0288490 A1* | 9/2020 | Lin | ........................ | H04W 76/27 |
| 2020/0328866 A1* | 10/2020 | Du | ......................... | H04L 5/0096 |
| 2021/0036822 A1* | 2/2021 | Lyu | ....................... | H04L 5/0048 |
| 2021/0160854 A1* | 5/2021 | Qu | ......................... | H04L 5/0005 |
| 2021/0195477 A1* | 6/2021 | Zhang | ................ | H04W 36/0058 |
| 2021/0345300 A1* | 11/2021 | Selvanesan | ............ | H04W 72/02 |
| 2022/0086816 A1* | 3/2022 | Zhang | ................. | H04L 5/0094 |

FOREIGN PATENT DOCUMENTS

| | | |
|---|---|---|
| CN | 109451853 A | 3/2019 |
| CN | 109495223 A | 3/2019 |
| CN | 109874176 A | 6/2019 |
| CN | 109996341 A | 7/2019 |
| CN | 110582122 A | 12/2019 |
| KR | 20180106860 A | 10/2018 |
| WO | 2018043960 A1 | 3/2018 |
| WO | 2019024037 A1 | 2/2019 |

OTHER PUBLICATIONS

ZTE, "UL multiplexing of transmissions with different reliability requirements", 3GPP TSG RAN WG1 Meeting #92bis, R1-1803803, 2018.

European Search Report for Application No. 20849872 dated Jul. 13, 2013.

LG Electronics, "Remaining issues on pre-emption indication for downlink," R1-1717970, 3GPP TSG RAN WG1 Meeting 90bis, Agenda Item: 7.3.3.6: 15 pages (Oct. 2017).

Qualcomm Incorporated, "eMBB and URLLC dynamic multiplexing and preemption indication on the uplink," R1-1802854, 3GPP TSG-RAN WG1 #92, Agenda item: 7.2.4: 8 pages (Mar. 2018).

Chinese Search Report in CN Application No. 201910722772.9, dated Oct. 21, 2024, 9 pages.

Chinese Office Action in CN Application No. 201910722772.9, dated Oct. 24, 2024, 18 pages.

* cited by examiner

RESOURCE INDICATION METHOD AND APPARATUS, AND SERVICE NODE AND STORAGE MEDIUM

CROSS-REFERENCE TO RELATED APPLICATION(S)

This is a national stage application filed under 37 U.S.C. 371 based on International Patent Application No. PCT/CN2020/103706, filed Jul. 23, 2020, which claims priority to Chinese Patent Application No. 201910722772.9 filed with the China National Intellectual Property Administration (CNIPA) on Aug. 6, 2019, the disclosures of which are incorporated herein by reference in their entireties.

TECHNICAL FIELD

The present application relates to wireless communication networks, for example, a resource indication method and apparatus, a serving node and a storage medium.

BACKGROUND

As the digitalization process of the society is accelerated continuously, wireless communication services cover increasingly rich application scenarios. Some traffic with a relatively high priority has relatively high requirements on reliability and transmission latency so that transmission resources need to be allocated to such uplink traffic as soon as possible, which, however, might have been allocated to other traffic with a relatively low priority. In this case, the traffic with a relatively high priority may preempt some resources that have been allocated for transmission. The traffic with a relatively high priority, such as Ultra-Reliable Low-Latency Communications (URLLC), is highly random and has a low probability of occurring multiple times within the same slot continually. There are no effective methods for accurately notifying a terminal of preempted time and frequency domain resources, resulting in low efficiency and poor reliability of a resource indication.

SUMMARY

The present application provides a resource indication method and apparatus, a serving node and a storage medium, so as to improve efficiency and reliability of a resource indication.

An embodiment of the present application provides a resource indication method. The method includes steps described below.

First resource indication information is sent to a user terminal, where the first resource indication information is used for indicating an uplink data transmission mechanism to the user terminal.

Uplink data sent by the user terminal is received.

An embodiment of the present application further provides a resource indication apparatus. The apparatus includes a sending module and a receiving module.

The sending module is configured to send first resource indication information to a user terminal, where the first resource indication information is used for indicating an uplink data transmission mechanism to the user terminal.

The receiving module is configured to receive uplink data sent by the user terminal.

An embodiment of the present application further provides a serving node. The serving node includes one or more processors and a storage apparatus.

The storage apparatus is configured to store one or more programs.

The one or more programs are executed by the one or more processors to cause the one or more processors to implement the preceding resource indication method.

An embodiment of the present application further provides a computer-readable storage medium, which is configured to store a computer program which, when executed by a processor, implements the preceding resource indication method.

DETAILED DESCRIPTION

Figure 1:
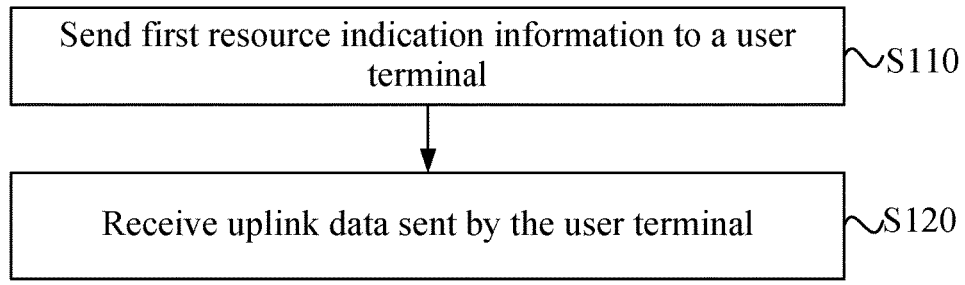
FIG. 1 is a flowchart of a resource indication method according to an embodiment.

The present application is described below in conjunction with drawings and embodiments. It is to be understood that the embodiments described herein are intended to illustrate the present application and not to limit the present application. It is to be noted that if not in collision, embodiments of the present application and features therein may be combined with each other in any manner. Additionally, it is to be noted that for ease of description, only part, not all, of structures related to the present application are illustrated in the drawings.

In the field of wireless communication, enhanced Mobile Broadband (eMBB), URLLC and Massive Machine-Type Communications (mMTC) have become three main application scenarios supported by the fifth generation of mobile communication system whose development trend is to support the eMBB, ultra-reliable ultra-low latency transmission, massive connections and the like. For uplink traffic such as URLLC, transmission resources need to be allocated as soon as possible or some resources that have been allocated may be preempted for transmission. In the related art, an indication region is divided into time and frequency domain resource blocks via semi-static signaling, and occupancy of each time and frequency domain resource block is dynamically indicated. However, URLLC traffic is random, and configuration of fixed time and frequency domain resource blocks leads to a waste of indication overhead resources and also limits the refinement of a frequency domain indication in the case where the indication overhead resources are fixed. Embodiments of the present application provide a resource indication method for effectively and accurately indicating resource preemption information to a terminal whose transmission is cancelled, so as to indicate an uplink transmission mechanism and improve efficiency and reliability of a resource indication.

FIG. 1 is a flowchart of a resource indication method according to an embodiment. As shown in FIG. 1, the method provided in this embodiment includes S110 and S120.

In S110, first resource indication information is sent to a user terminal, where the first resource indication information is used for indicating an uplink data transmission mechanism to the user terminal.

In S120, uplink data sent by the user terminal is received.

In this embodiment, a serving node indicates the uplink data transmission mechanism to the user terminal by sending the first resource indication information to the user terminal, for example, indicates to the user terminal a time domain pattern, the number of time domain units contained in a reference uplink resource, a time domain unit with an occupied resource, an occupied frequency domain unit in each time domain unit with an occupied resource, a frequency domain granularity and the like, so that a resource indication granularity is refined and preempted time and frequency domain resources are indicated to the user terminal by use of limited indication resource bit overheads. The user terminal sends the uplink data on a corresponding time and frequency domain resource according to the uplink data transmission mechanism indicated by the serving node.

In an embodiment, the serving node sends the first resource indication information to the user terminal via physical layer signaling to indicate a time and frequency domain resource of traffic in a first transmission time interval that is preempted by traffic in a second transmission time interval, where the first transmission time interval is greater than the second transmission time interval. For example, the first resource indication information is used for indicating to the user terminal a length of a time domain region and a time domain pattern of the preempted time and frequency domain resource, where the length of the time domain region and the time domain pattern may be determined in the following manner: the length of the time domain region is predefined by a protocol or configured via higher-layer signaling, and the time domain pattern is indicated via physical layer signaling or configured via higher-layer signaling; or the length of the time domain region is predefined by the protocol or configured via the higher-layer signaling, and the time domain pattern is determined according to the determined length of the time domain region. For example, the first resource indication information is used for indicating to the user terminal occupancy of a time domain occasion and a frequency domain granularity of the preempted time and frequency domain resource, where the occupancy of the time domain occasion and the frequency domain granularity may be determined in the following manner: both the occupancy of the time domain occasion and the frequency domain granularity are indicated via the physical layer signaling or configured via the higher-layer signaling; or the occupancy of the time domain occasion is indicated via the physical layer signaling or configured via the higher-layer signaling, and the frequency domain granularity is determined according to the determined occupancy of the time domain occasion.

In an embodiment, the length of the time domain region may be one or more slots or one or more time domain symbols. The time domain occasion is contained in the time domain region, and the time domain region is divided into one or more portions that do not overlap each other.

In an embodiment, a frequency domain granularity of the same bandwidth corresponding to the time domain occasion is determined according to a frequency domain indication bit of the time domain occasion, and frequency domain granularities may be the same or different.

According to the resource indication method in this embodiment, the first resource indication information is sent to the user terminal and the uplink data transmission mechanism is indicated to the user terminal so that resource preemption information is effectively and accurately indicated to a terminal whose transmission is cancelled, thereby improving efficiency and reliability of a resource indication.

In an embodiment, the first resource indication information contains at least one of time domain pattern information, time domain unit information or frequency domain resource information. In this embodiment, the first resource indication information may be predefined by the protocol, configured via the higher-layer signaling, or indicated via the physical layer signaling.

In an embodiment, the time domain pattern information is used for indicating the number of time domain units contained in the reference uplink resource (RUR) and a time domain length of each time domain unit. In this embodiment, the reference uplink resource is a resource indication range and contains at least one time domain unit, where time domain units do not overlap each other. The time domain pattern is a combination of the at least one time domain unit in the reference uplink resource. The time domain unit includes at least one time domain occasion or at least one time domain symbol.

In this embodiment, the RUR may be one or more physical resource blocks (RBs) or one or more physical resource block groups (RBGs) in frequency domain. The RUR may be determined through a predefinition or a semi-static configuration. The RUR is greater than or equal to a monitoring interval of resource indication signaling in time domain and may be determined through the predefinition or the semi-static configuration. For example, the RUR is one or more slots or one or more time domain symbols in the time domain.

In this embodiment, the RUR may be divided into different time domain patterns in the time domain. Under each pattern, the RUR contains one or more time domain occasions that do not overlap each other, where the time domain occasion does not exceed a time domain length of the RUR. The RUR contains at least one complete time domain occasion.

Figure 2:
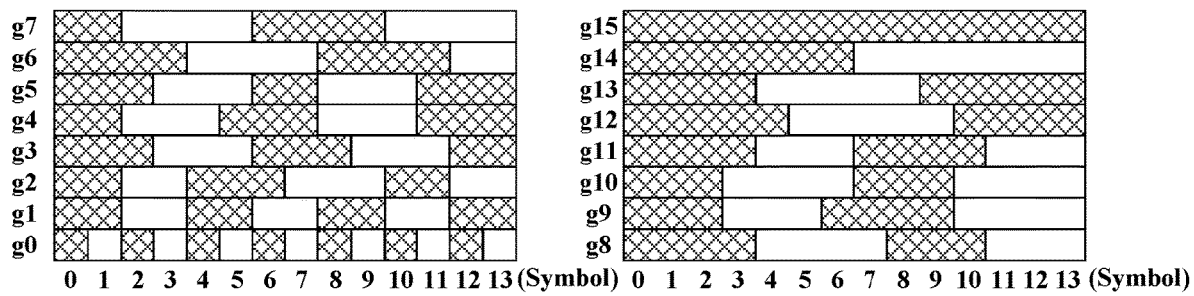
FIG. 2 is a schematic diagram of time domain patterns of a reference uplink resource with a length of one slot according to an embodiment.

FIG. 2 is a schematic diagram of time domain patterns of a reference uplink resource with a length of one slot according to an embodiment. As shown in FIG. 2, in the case where the RUR is one slot, there may be 16 patterns in total, g0 to g15. For example, g0 contains fourteen occasions, each occasion occupying one symbol; g1 contains seven occasions, each occasion occupying two symbols; g2 contains six occasions which occupy symbol 0 to symbol 1, symbol 2 to symbol 3, symbol 4 to symbol 6, symbol 7 to symbol 9, symbol 10 to symbol 11 and symbol 12 to symbol 13 in sequence; g3 contains five occasions which occupy symbol 0 to symbol 2, symbol 3 to symbol 5, symbol 6 to symbol 8, symbol 9 to symbol 11 and symbol 12 to symbol 13 in sequence; g14 contains two occasions which occupy symbol 0 to symbol 6 and symbol 7 to symbol 13 in sequence; and g15 contains one occasion which occupies symbol 0 to symbol 13, and so on. Shaded and blank portions in each pattern are used only to illustrate adjacent occasions that do not overlap each other.

Figure 3:
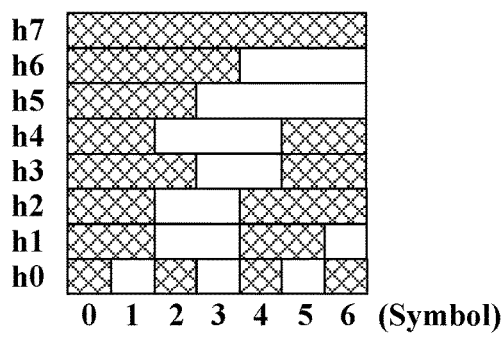
FIG. 3 is a schematic diagram of time domain patterns of a reference uplink resource with a length of seven symbols according to an embodiment.

FIG. 3 is a schematic diagram of time domain patterns of a reference uplink resource with a length of seven symbols according to an embodiment. As shown in FIG. 3, in the case where the RUR is seven symbols, there are eight patterns in total, h0 to h7.

Figure 4:
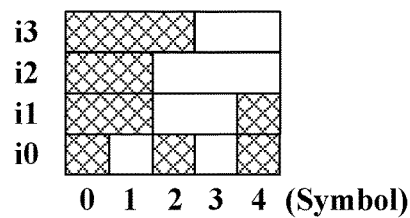
FIG. 4 is a schematic diagram of time domain patterns of a reference uplink resource with a length of five symbols according to an embodiment.

FIG. 4 is a schematic diagram of time domain patterns of a reference uplink resource with a length of five symbols according to an embodiment. As shown in FIG. 4, in the case where the RUR is five symbols, there are four patterns in total, i0 to i3.

In an embodiment, there may be other forms of time domain patterns.

In an embodiment, the time domain pattern information is indicated in at least one of manners described below.

The time domain pattern information is implicitly indicated by the time domain length of the reference uplink resource, where the time domain length of the reference uplink resource has a mapping relationship with the time domain pattern information, the mapping relationship is predefined by the protocol, and the time domain length of the reference uplink resource is sent to the user terminal via the higher-layer signaling.

The time domain pattern information is indicated via the higher-layer signaling, where the time domain pattern information includes an index of the time domain pattern and candidate time domain patterns, indexes of the candidate time domain patterns are predefined by the protocol, and the number of bits indicating the index of the time domain pattern is determined according to the number of the candidate time domain patterns.

The time domain pattern information is indicated via the higher-layer signaling, where the time domain pattern information is configured via the higher-layer signaling.

The time domain pattern information is sent via the physical layer signaling, where the time domain pattern information includes an index of a time domain pattern, the index of the time domain pattern is predefined by the protocol, and the number of bits indicating the index of the time domain pattern is determined according to the number of candidate time domain patterns.

The time domain pattern information is indicated via the physical layer signaling, where the time domain pattern information includes an index of one time domain pattern of a first number of time domain patterns, the first number of time domain patterns are configured via the higher-layer signaling, and the number of bits indicating the index of the one time domain pattern is determined according to the first number.

The time domain pattern information is indicated via the physical layer signaling, where the time domain pattern information includes an index of one time domain pattern of a second number of time domain patterns, the second number of time domain patterns are selected via the higher-layer signaling from candidate time domain patterns whose indexes are predefined by the protocol, and the number of bits indicating the index of the one time domain pattern is determined according to the second number.

In an embodiment, in the case where the time domain pattern information is implicitly indicated by the time domain length of the reference uplink resource, a correspondence between the time domain length of the RUR and a pattern is predefined, and the pattern may be determined according to a time domain length of a configured RUR. In this case, each time domain length of the RUR corresponds to one pattern. For example, in the case where the time domain length of the RUR is one slot, the corresponding pattern is g1 in FIG. 2; in the case where the time domain length of the RUR is seven symbols, the corresponding pattern is h1 in FIG. 3; in the case where the time domain length of the RUR is five symbols, the corresponding pattern is i1 in FIG. 4.

In an embodiment, the index of the time domain pattern is indicated via the higher-layer signaling, where X patterns are predefined in the protocol and a corresponding pattern index is defined for each pattern. The index of the pattern is semi-statically configured via the higher-layer signaling such as radio resource control (RRC) signaling. In this case, an indication overhead of the index is q0. For example, in FIG. 2, in the case where the time domain length of the RUR is one slot, there are 16 candidate patterns and $q0=\lceil \log_2 16 \rceil = 4$ bits. For example, in FIG. 3, in the case where the time domain length of the RUR is seven symbols, there are eight candidate patterns and $q0=\lceil \log_2 8 \rceil = 3$ bits. For example, in FIG. 4, in the case where the time domain length of the RUR is five symbols, there are four candidate patterns and $q0=\lceil \log_2 4 \rceil = 2$ bits.

In an embodiment, when the time domain pattern information is indicated via the higher-layer signaling, the pattern is configured via the higher-layer signaling. In this embodiment, a time domain division of the RUR is indicated via higher-layer signaling, for example, the number of time domain occasions contained in the RUR and a symbol contained in each time domain occasion are indicated.

In an embodiment, the time domain pattern information is sent via the physical layer signaling. In this embodiment, X patterns are predefined in the protocol and the corresponding pattern index is defined for each pattern. The pattern is dynamically indicated via the physical layer signaling, and an overhead of the index is q0. As shown in FIG. 2, in the case where the time domain length of the RUR is one slot, there are 16 candidate patterns and $q0=\lceil \log_2 16 \rceil = 4$ bits. As shown in FIG. 3, in the case where the time domain length of the RUR is seven symbols, there are eight candidate patterns and $q0=\lceil \log_2 8 \rceil = 3$ bits. As shown in FIG. 4, in the case where the time domain length of the RUR is five symbols, there are four candidate patterns and $q0=\lceil \log_2 4 \rceil = 2$ bits.

In an embodiment, the time domain pattern information is indicated via the physical layer signaling, where the time domain pattern information includes the index of one time domain pattern of the first number of time domain patterns. For example, X1 patterns are configured via the higher-layer signaling and one of the X1 patterns is indicated via the physical layer signaling. In this case, the first number is X1, and a bit overhead for indicating the time domain pattern information via the physical layer signaling is $\lceil \log_2 X1 \rceil$ bits.

In an embodiment, the time domain pattern information is indicated via the physical layer signaling, where the time domain pattern information includes the index of one time domain pattern of the second number of time domain patterns and the second number of time domain patterns are selected via the higher-layer signaling from the candidate time domain patterns. For example, X2 patterns are predefined in the protocol and indexes of the X2 patterns are 0 to X2-1, respectively; and Y patterns are selected via the higher-layer signaling from the X2 patterns and indicated to the terminal, where an indication overhead is X2 bits (that is, which Y patterns among the X2 patterns are configured is indicated by a bitmap of X2 bits). In this case, each bit of the X2 bits corresponds to one predefined pattern. One of the Y patterns is indicated via the physical layer signaling. In this case, the second number is Y, and the bit overhead for indicating the time domain pattern information via the physical layer signaling is $\lceil \log_2 Y \rceil$ bits.

The time domain pattern of the RUR is indicated through the preceding embodiments. On the basis that the time domain pattern is determined, the serving node may indicate an occupied time domain occasion in the pattern by use of relatively a few resources.

In an embodiment, the time domain unit information is used for indicating a time domain unit with an occupied resource in an RUR in a time domain pattern, and the number of bits of the time domain unit information is equal to the total number of time domain units in the time domain pattern.

In this embodiment, the RUR is the resource indication range and contains at least one time domain unit, and the time domain units do not overlap each other; the time domain pattern is a combination of the at least one time domain unit in the RUR; and the time domain unit includes at least one time domain occasion or at least one time domain symbol.

In this embodiment, the number of time domain units in the RUR is determined, and the time domain unit may be the time domain occasion or the time domain symbol. For example, in the case where the time domain occasion is used as a time domain indication unit, a pattern of occasion distribution in the RUR may be determined by the methods in the preceding embodiments, so as to obtain the number of occasions in the RUR. Other methods for determining time domain units in the RUR or a time domain indication granularity are not excluded in this embodiment. The occupancy of the time domain unit may be indicated for each time domain unit in the RUR.

In an embodiment, the time domain unit information is indicated in the following manner: the time domain unit information is indicated by a bitmap, where the time domain unit information includes an occupancy state of each time domain unit in the reference uplink resource in the time domain pattern, the occupancy state includes occupied and available, and the bitmap is sent to the user terminal via the physical layer signaling.

In this embodiment, the occupancy of the time domain unit in the RUR is dynamically indicated via the physical layer signaling, and the time domain unit may be the time domain occasion or the time domain symbol. For example, one bitmap is configured via the physical layer signaling, a bit overhead q1 corresponding to the bitmap is equal to the number of time domain units in the RUR, and whether each time domain unit is occupied is indicated by the bitmap. For example, if the time domain length of the RUR is one slot, the corresponding pattern is g2 in FIG. 2, and there are six occasions in the pattern g2, a bitmap of six bits is configured via the physical layer signaling, where 1 represents occupied and 0 represents available. For example, a bitmap 100111 indicates that first, fourth, fifth and sixth time domain occasions are occupied. In this embodiment, an indication of the time domain unit with the occupied resource is implemented. On the basis that the occupancy of the time domain unit is determined, the serving node may indicate an occupied frequency domain resource only for the time domain unit with the occupied resource, so as to refine an indication of a frequency domain resource and improve accuracy of the resource indication.

In an embodiment, the frequency domain resource information is used for indicating an occupied frequency domain unit in each time domain unit with an occupied resource and includes a third number of pieces of indication sub-information, where the third number is equal to the total number of time domain units with occupied resources in the RUR in the time domain pattern; where the third number n is a positive integer; the RUR is the resource indication range and contains at least one time domain unit, and the time domain units do not overlap each other; the time domain pattern is a combination of the at least one time domain unit in the RUR; and the time domain unit includes at least one time domain occasion or at least one time domain symbol.

In this embodiment, on the basis that the pattern is determined, a frequency domain indication bit is determined for each time domain unit in the RUR. For example, in the case where the time domain occasion is used as the time domain unit, the pattern of occasion distribution in the RUR is determined and the number of occasions with occupied resources in the RUR is determined by the methods in the preceding embodiments, and then a frequency domain indication bit corresponding to each time domain occasion is determined. The frequency domain resource information includes the third number of pieces of indication sub-information, and the third number is equal to the total number of time domain units with occupied resources in the RUR.

In an embodiment, the number of frequency domain indication bits for indicating the frequency domain unit is determined according to the total number of bit resources for indicating time and frequency domain resource information, the number of bit resources for indicating the time domain pattern and the number of bit resources for indicating the time domain units, where the total number of bit resources for indicating time and frequency domain resource information is predefined by the protocol, configured via the higher-layer signaling or indicated via the physical layer signaling; and the total number of bit resources for indicating time and frequency domain resource information is a sum of the number of frequency domain indication bits, the number of bit resources for indicating the time domain pattern and the number of bit resources for indicating the time domain units.

In this embodiment, the number of bit resources required for indicating a distribution pattern in the RUR is q0, the number of bit resources required for indicating the number of time domain units occupied in the RUR is q1, the number of frequency domain indication bits for indicating the frequency domain unit is q2, and the total number of bit resources for indicating time and frequency domain resource information is Q; then, q2 is determined according to Q, q0 and q1. For example, q2=Q−q0−q1. Q is predefined by the protocol, configured via the higher-layer signaling, or indicated via the physical layer signaling.

In an embodiment, bit resources for indicating frequency domain units are allocated to the time domain units according to a principle of equal allocation. The total number of time domain units with occupied resources in the RUR is n, and the time domain unit may be the time domain occasion or the time domain symbol.

In this embodiment, in the case where the number q2 of frequency domain indication bits is an integer multiple of n, the number of frequency domain indication bits allocated to each of the time domain units is a ratio of the number of frequency domain indication bits to n. For example, the number of frequency domain indication bits allocated to each time domain unit is $$\frac{q2}{n}.$$

In this embodiment, in the case where the number q2 of frequency domain indication bits is not an integer multiple of n, first bit resources are allocated to each of the time domain units, where the number of the first bit resources is a result of rounding down the ratio of the number of frequency domain indication bits to n, and remaining bit resources of the bit resources for indicating frequency domain units are allocated to the time domain units one by one until zero bit resources remain. The time domain units are arranged in a first order or a second order, the first order is a chronological order of the time domain units, the second order is a descending order of time domain lengths of the time domain units, when two or more time domain units of the time domain units have the same time domain length, the two or more time domain units are arranged in the chronological order. For example, in the case where q2 is not an integer multiple of n, $$\left\lfloor \frac{q2}{n} \right\rfloor$$

first bit resources are allocated to each time domain unit, and then the remaining bit resources (the number of the remaining bit resources is $$q2 - \left\lfloor \frac{q2}{n} \right\rfloor \times n)$$

of q2 frequency domain indication bit resources are allocated to the time domain units one by one. For example, the time domain units are time domain occasions, and the time domain occasions are arranged in the second order. In this case, a time domain occasion occupying more symbols precedes and then time domain occasions with the same time domain length are arranged in the chronological order; and the remaining bit resources are allocated to the time domain occasions one by one, one bit each time. For example, if the number $q_2$ of frequency domain indication bits is 11, the time domain pattern is h4 in FIG. 3, the number n of occupied time domain occasions is 3, and the occupied time domain occasions are occasion0 (symbol 0 to symbol 1), occasion1 (symbol 2 to symbol 4) and occasion2 (symbol 5 to symbol 6) in sequence, the occupied time domain occasions are arranged in the second order as follows: [occasion1, occasion0, occasion2]. In this case, the first bit resources allocated to each time domain occasion is $$\left\lfloor \frac{11}{3} \right\rfloor = 3$$

bits, and the remaining 2 bits are allocated to occasion1 and occasion0 one by one, one bit for each. Finally, q0=4 bits, q1=4 bits, and q2=3 bits.

In an embodiment, the bit resources for indicating frequency domain units are allocated to the time domain units according to a principle that the time domain length of the time domain unit is positively correlated to the number of bits. In this embodiment, the frequency domain indication bit is preferentially allocated to a time domain unit with a larger time domain length. The total number of time domain units with occupied resources in the RUR is n, and the time domain unit may be the time domain occasion or the time domain symbol. The number of bit resources required for indicating the distribution pattern in the RUR is q0, the number of bit resources required for indicating the number of time domain units occupied in the RUR is q1, the number of frequency domain indication bits for indicating the frequency domain unit is q2, and the total number of bit resources for indicating time and frequency domain resource information is Q; then, q2=Q−q0−q1. Assuming that the number of frequency domain indication bits for an i-th time domain unit is $q_i$ (i=0, 1, 2, . . . , n−1), the q2 frequency domain indication bit resources are allocated to the time domain units. In this case, $$q2 = \sum_{i=0}^{n-1} q_i.$$

In an embodiment, the bit resources for indicating frequency domain units are cyclically allocated to the time domain units one by one until zero bit resources remain, where the time domain units are arranged in the second order. In this case, an occasion occupying more symbols precedes and then occasions with the same length are arranged in the chronological order. In this embodiment, the q2 frequency domain indication bit resources are cyclically allocated to the time domain occasions in sequence, one bit each time. For example, if the number q2 of allocable frequency domain indication bit resources is 11, the time domain pattern is h4 in FIG. 3, the number n of occupied occasions is 3, and the occupied occasions are occasion0 (symbol 0 to symbol 1), occasion1 (symbol 2 to symbol 4) and occasion2 (symbol 5 to symbol 6) in sequence, the occupied occasions are arranged in the second order as follows: [occasion1, occasion0, occasion2]. The frequency domain indication bits are allocated in sequence. Finally, q0=4 bits, q1=4 bits, and q2=3 bits.

In an embodiment, second bit resources are allocated to each of the time domain units, where the number of second bit resources allocated to the i-th time domain unit is a result of rounding down a product of the number of frequency domain indication bits and a first parameter; and the remaining bit resources of the bit resources for indicating frequency domain units are allocated to the time domain units one by one. The first parameter is a ratio of $l_i$ to L, where $l_i$ denotes a time domain length of the i-th time domain unit, L denotes a total time domain length of the RUR or a total time domain length of the time domain units with occupied resources. The time domain units are arranged in the second order, the second order is the descending order of the time domain lengths of the time domain units, when two or more the time domain units of the time domain units have the same length, the two or more time domain units are arranged in the chronological order.

In an embodiment, if the total number of time domain units with occupied resources in the RUR is n, the total time domain length of the RUR is L, and the time domain length of the i-th time domain unit is $l_i$ (i=0, 1, 2, . . . , n−1), the second bit resources are allocated to each time domain unit, where the number of second bit resources allocated to the i-th time domain unit is $$q'_i = \left\lfloor q2 \times \frac{l_i}{L} \right\rfloor;$$

and the remaining bit resources of the q2 frequency domain indication bit resources are allocated to the occupied time domain units one by one, one bit each time. The time domain units are arranged in the second order, the occasion occupying more symbols precedes and then the occasions with the same length are arranged in the chronological order. For example, if the number q2 of allocable frequency domain indication bit resources is 11, the time domain pattern is h4 in FIG. 3, the number n of occupied occasions is 3, and the occupied occasions are occasion0 (symbol 0 to symbol 1), occasion1 (symbol 2 to symbol 4) and occasion2 (symbol 5 to symbol 6) in sequence, the occupied occasions are arranged in the second order as follows: [occasion1, occasion0, occasion2]. The second bit resources are allocated to each time domain unit, where the number of second bit resources allocated to occasion0, occasion1 and occasion2 is $$\left\lfloor 11 \times \frac{2}{7} \right\rfloor = 3 \text{ bits}, \left\lfloor 11 \times \frac{3}{7} \right\rfloor = 4 \text{ bits and } \left\lfloor 11 \times \frac{2}{7} \right\rfloor = 3 \text{ bits},$$

respectively; and the remaining one bit is allocated to the first one of [occasion1, occasion0, occasion2], that is, occasion1. Finally, q0=3 bits, q1=5 bits, and q2=3 bits.

In an embodiment, if the total number of time domain units with occupied resources in the RUR is n, the total time domain length of the time domain units with occupied resources in the RUR is L, and the time domain length of the i-th time domain unit is $l_i$ (i=0, 1, 2, ..., n−1), the second bit resources are allocated to each time domain unit, where the number of second bit resources allocated to the i-th time domain unit is $$q'_i = \left\lfloor q2 \times \frac{l_i}{L} \right\rfloor;$$

and the remaining bit resources of the q2 frequency domain indication bit resources are allocated to the occupied time domain units one by one, one bit each time. The time domain units are arranged in the second order.

In an embodiment, the bit resources for indicating frequency domain units are allocated to target time domain units, where the target time domain units include first m time domain units of the time domain units, m is a threshold of the number of time domain units, and the number of bit resources corresponding to a remaining time domain unit of the time domain units except the first m time domain units is 0. In this embodiment, if the number of time domain units with occupied resources is n and the threshold is m, the q2 frequency domain indication bit resources are allocated to the first m time domain units of the n time domain units.

In an embodiment, the time domain units are arranged in the first order which is the chronological order of the time domain units; and occupancy states of all frequency domain units corresponding to the remaining time domain unit are specified by the protocol, configured via the higher-layer signaling, or configured via the physical layer signaling, where each of the occupancy states includes occupied and available. For example, in the case where n>m, frequency domain allocation bits may be determined for first m target time domain units in the time domain by the method in any one of the preceding embodiments; for last (n-m) time domain units in the time domain, a frequency domain allocation granularity is [1] by default, that is, an entire frequency domain resource is allocated, and the occupancy states of all the frequency domain units corresponding to the remaining time domain unit are occupied. For example, if the number q2 of allocable frequency domain indication bit resources is 11, the time domain pattern is h4 in FIG. 3, the number n of occupied occasions is 3, a time domain occasion threshold m is 2, and occupied occasions within the threshold are occasion0 (symbol 0 to symbol 1) and occasion1 (symbol 2 to symbol 4) in sequence, the occupied occasions are arranged in the first order as follows: [occasion0, occasion1].

$$\left\lfloor 11 \times \frac{2}{2+3} \right\rfloor = 4 \text{ bits and } \left\lfloor 11 \times \frac{3}{2+3} \right\rfloor = 6 \text{ bits}$$

are allocated to occasion0 and occasion1, respectively, and the remaining one bit of q2 bit resources is allocated to the first time domain unit occasion0 of [occasion0, occasion1]. Finally, q0=5 bits, q1=6 bits, and no frequency domain indication bit resources are allocated to occasion2 by default. The entire frequency domain resource is allocated to occasion2 by default and the occupancy state is occupied.

For example, in the case where n>m, the frequency domain allocation bits may be determined for the first m target time domain units in the time domain, first m occasions in the time domain, by the method in any one of the preceding embodiments; and the last (n-m) time domain units in the time domain are discarded, and no frequency domain resources are allocated by default. For example, if the number q2 of allocable frequency domain indication bit resources is 11, the time domain pattern is h4 in FIG. 3, the number n of occupied occasions is 3, the time domain occasion threshold m is 2, and the occupied occasions within the threshold are occasion0 (symbol 0 to symbol 1) and occasion1 (symbol 2 to symbol 4) in sequence, the occupied occasions are arranged in the first order as follows: [occasion0, occasion1].

$$\left\lfloor 11 \times \frac{2}{2+3} \right\rfloor = 4 \text{ bits}$$

and $$\left\lfloor 11 \times \frac{3}{2+3} \right\rfloor = 6 \text{ bits}$$

are allocated to occasion0 and occasion1, respectively, and the remaining one bit of the q2 bit resources is allocated to the first time domain unit occasion0 of [occasion0, occasion1]. Finally, q0=5 bits, q1=6 bits, and no frequency domain indication bit resources are allocated to occasion2 by default. Occasion2 is discarded by default and the occupancy state is available.

In an embodiment, the time domain units are arranged in the second order, the second order is the descending order of the time domain lengths of the time domain units, when two or more the time domain units of the time domain units have the same time domain length, the two or more time domain units are arranged in the chronological order. In this embodiment, the occupancy states of all the frequency domain units corresponding to the remaining time domain unit are specified by the protocol, configured via the higher-layer signaling, or configured via the physical layer signaling, where each of the occupancy states includes occupied. For example, in the case where n>m, occupied occasions are arranged according to the time domain lengths of the time domain occasions and in the chronological order, where the time domain occasion occupying more symbols precedes and the occasions with the same length are arranged in the chronological order. The frequency domain allocation bits may be determined for the first m occasions by the method in any one of the preceding embodiments, and the frequency domain allocation granularity for last (n-m) time domain occasions is [1], that is, the entire frequency domain resource is allocated. For example, if the number q2 of allocable frequency domain indication bit resources is 11, the time domain pattern is h2 in FIG. 3, and the number n of occupied occasions is 3, the occupied occasions are arranged in the second order as follows: [occasion2, occasion0, occasion1]. If m=2, the target time domain units within the threshold are occasion2 and occasion0 in sequence.

$$q'_0 = \left\lfloor 11 \times \frac{2}{2+3} \right\rfloor = 4 \ bits$$

and $$q'_2 = \left\lfloor 11 \times \frac{3}{2+3} \right\rfloor = 6 \ bits$$

are allocated to occasion0 and occasion2, respectively, and the remaining one bit is allocated to occasion2 at the highest rank. Then, q0=4 bits, q2=7 bits, and no frequency domain indication bit resources are allocated to occasion1 by default. An occupied frequency domain resource corresponding to occasion1 is an entire frequency domain bandwidth by default.

In this embodiment, in the case where n<m, the bit resources for indicating frequency domain units are allocated to the time domain units by the method involving no threshold in the preceding embodiments. In the preceding embodiments, on the premise that the time domain units are determined to be occupied, if some time domain occasion is allocated with no frequency domain indication bits, the frequency domain resource corresponding to this time domain unit is an entire bandwidth by default or this time domain unit occupies no corresponding frequency domain resources by default. For the last (n-m) time domain units, the serving node does not require additional indication overheads, thereby saving resources and improving indication efficiency and reliability. In this embodiment, on the basis that a frequency domain indication bit resource for each occupied time domain unit is determined, the serving node may flexibly assign a frequency domain indication granularity for the time domain unit by use of these resources, thereby refining the dimension of the resource indication and improve reliability.

In an embodiment, the method further includes: assigning a frequency domain region according to the number of frequency domain indication bit resources for each of the time domain units. Using the time domain occasion as an example of the time domain unit, the pattern of occasion distribution in the RUR, the number of occasions occupied in the RUR and the frequency domain indication bit corresponding to each occupied time domain occasion may be determined through the preceding embodiments. Other methods for determining the pattern of occasion distribution in the RUR, other methods for determining the number of occasions occupied in the RUR and other methods for determining the frequency domain indication bit corresponding to the occupied time domain occasion are not excluded. In this embodiment, a method for assigning the frequency domain region is not limited.

In an embodiment, a frequency domain granularity of the same bandwidth corresponding to each of the time domain units is determined, where the frequency domain granularity is used for assigning the frequency domain region, and all frequency domain granularities corresponding to the time domain units are combined into a frequency domain region pattern. A frequency domain granularity of the same bandwidth corresponding to an occasion is determined according to a frequency domain indication bit for this time domain occasion.

In an embodiment, a frequency domain granularity of the same bandwidth corresponding to the i-th time domain unit is $$\frac{1}{q_i}$$

times the frequency domain region, where $q_i$ is used for indicating the number of bit resources for the i-th time domain unit; or a frequency domain granularity of the same bandwidth corresponding to the i-th time domain unit is an integer power of ½ times the frequency domain region. For example, using the time domain occasion as the time domain unit, the frequency domain granularity of the same bandwidth corresponding to the time domain unit may include the cases below.

If the number of frequency domain indication bit resources for the time domain occasion is 1, the frequency domain granularity may be [1] time the frequency domain region.

If the number of frequency domain indication bit resources for the time domain occasion is 2, the frequency domain granularities may be $$\left[\frac{1}{2} \ \frac{1}{2}\right]$$

times the frequency domain region, that is, each time domain unit corresponds to ½ times the frequency domain region.

If the number of frequency domain indication bit resources for the time domain occasion is 3, the frequency domain granularities may be $$\left[\frac{1}{3} \ \frac{1}{3} \ \frac{1}{3}\right]$$

times the frequency domain region, that is, each time domain unit corresponds to ⅓ times the frequency domain region; or the frequency domain granularities are $$\left[\frac{1}{4} \ \frac{1}{4} \ \frac{1}{2}\right]$$

times the frequency domain region, that is, the frequency domain bandwidth is divided into three frequency domain regions, each of which corresponds to three frequency domain indication bits, where $$\left[\frac{1}{4}\frac{1}{4}\frac{1}{2}\right]$$

indicates two granularities of ¼ times the frequency domain region and one granularity of ½ times the frequency domain region.

If the number of frequency domain indication bit resources for the time domain occasion is 4, the frequency domain granularities may be $$\left[\frac{1}{4}\frac{1}{4}\frac{1}{4}\frac{1}{4}\right]$$

times the frequency domain region.

If the number of frequency domain indication bit resources for the time domain occasion is 5, the frequency domain granularities may be $$\left[\frac{1}{5}\frac{1}{5}\frac{1}{5}\frac{1}{5}\frac{1}{5}\right]$$

times the frequency domain region, $$\left[\frac{1}{8}\frac{1}{8}\frac{1}{8}\frac{1}{8}\frac{1}{2}\right]$$

times the frequency domain region or $$\left[\frac{1}{8}\frac{1}{8}\frac{1}{4}\frac{1}{4}\frac{1}{4}\right]$$

times the frequency domain region.

If the number of frequency domain indication bit resources for the time domain occasion is 6, the frequency domain granularities may be $$\left[\frac{1}{6}\frac{1}{6}\frac{1}{6}\frac{1}{6}\frac{1}{6}\frac{1}{6}\right]$$

times the frequency domain region or $$\left[\frac{1}{8}\frac{1}{8}\frac{1}{8}\frac{1}{8}\frac{1}{4}\frac{1}{4}\right]$$

times the frequency domain region.

If the number of frequency domain indication bit resources for the time domain occasion is 7, the frequency domain granularities may be $$\left[\frac{1}{7}\frac{1}{7}\frac{1}{7}\frac{1}{7}\frac{1}{7}\frac{1}{7}\frac{1}{7}\right]$$

times the frequency domain region or $$\left[\frac{1}{8}\frac{1}{8}\frac{1}{8}\frac{1}{8}\frac{1}{8}\frac{1}{8}\frac{1}{4}\right]$$

times the frequency domain region.

If the number of frequency domain indication bit resources for the time domain occasion is 8, the frequency domain granularities may be $$\left[\frac{1}{8}\frac{1}{8}\frac{1}{8}\frac{1}{8}\frac{1}{8}\frac{1}{8}\frac{1}{8}\frac{1}{8}\right]$$

times the frequency domain region.

If the number of frequency domain indication bit resources for the time domain occasion is 9, the frequency domain granularities may be $$\left[\frac{1}{9}\frac{1}{9}\frac{1}{9}\frac{1}{9}\frac{1}{9}\frac{1}{9}\frac{1}{9}\frac{1}{9}\frac{1}{9}\right]$$

times the frequency domain region or $$\left[\frac{1}{16}\frac{1}{16}\frac{1}{16}\frac{1}{16}\frac{1}{8}\frac{1}{8}\frac{1}{8}\frac{1}{4}\right]$$

times the frequency domain region.

If the number of frequency domain indication bit resources for the time domain occasion is 10, the frequency domain granularities may be $$\left[\frac{1}{10}\frac{1}{10}\frac{1}{10}\frac{1}{10}\frac{1}{10}\frac{1}{10}\frac{1}{10}\frac{1}{10}\frac{1}{10}\frac{1}{10}\right]$$

times the frequency domain region or $$\left[\frac{1}{16}\frac{1}{16}\frac{1}{16}\frac{1}{16}\frac{1}{8}\frac{1}{8}\frac{1}{8}\frac{1}{8}\frac{1}{8}\right]$$

times the frequency domain region.

If the number of frequency domain indication bit resources for the time domain occasion is 11, the frequency domain granularities may be $$\left[\frac{1}{11}\frac{1}{11}\frac{1}{11}\frac{1}{11}\frac{1}{11}\frac{1}{11}\frac{1}{11}\frac{1}{11}\frac{1}{11}\frac{1}{11}\frac{1}{11}\right]$$

times the frequency domain region or $$\left[\frac{1}{16}\frac{1}{16}\frac{1}{16}\frac{1}{16}\frac{1}{16}\frac{1}{16}\frac{1}{8}\frac{1}{8}\frac{1}{8}\frac{1}{8}\right]$$

times the frequency domain region.

If the number of frequency domain indication bit resources for the time domain occasion is 12, the frequency domain granularities may be $$\left[\frac{1}{12}\frac{1}{12}\frac{1}{12}\frac{1}{12}\frac{1}{12}\frac{1}{12}\frac{1}{12}\frac{1}{12}\frac{1}{12}\frac{1}{12}\frac{1}{12}\frac{1}{12}\right]$$

times the frequency domain region or $$\left[\frac{1}{16}\frac{1}{16}\frac{1}{16}\frac{1}{16}\frac{1}{16}\frac{1}{16}\frac{1}{16}\frac{1}{16}\frac{1}{8}\frac{1}{8}\frac{1}{8}\frac{1}{8}\right]$$

times the frequency domain region.

If the number of frequency domain indication bit resources for the time domain occasion is 13, the frequency domain granularities may be $$\left[\frac{1}{13}\frac{1}{13}\frac{1}{13}\frac{1}{13}\frac{1}{13}\frac{1}{13}\frac{1}{13}\frac{1}{13}\frac{1}{13}\frac{1}{13}\frac{1}{13}\frac{1}{13}\frac{1}{13}\right]$$

times the frequency domain region or $$\left[\frac{1}{16}\frac{1}{16}\frac{1}{16}\frac{1}{16}\frac{1}{16}\frac{1}{16}\frac{1}{16}\frac{1}{16}\frac{1}{16}\frac{1}{8}\frac{1}{8}\frac{1}{8}\right]$$

times the frequency domain region.

If the number of frequency domain indication bit resources for the time domain occasion is 14, the frequency domain granularities may be $$\left[\frac{1}{14}\frac{1}{14}\frac{1}{14}\frac{1}{14}\frac{1}{14}\frac{1}{14}\frac{1}{14}\frac{1}{14}\frac{1}{14}\frac{1}{14}\frac{1}{14}\frac{1}{14}\frac{1}{14}\frac{1}{14}\right]$$

times the frequency domain region or $$\left[\frac{1}{16}\frac{1}{16}\frac{1}{16}\frac{1}{16}\frac{1}{16}\frac{1}{16}\frac{1}{16}\frac{1}{16}\frac{1}{16}\frac{1}{16}\frac{1}{16}\frac{1}{16}\frac{1}{8}\frac{1}{8}\right]$$

times the frequency domain region.

If the number of frequency domain indication bit resources for the time domain occasion is 15, the frequency domain granularities may be $$\left[\frac{1}{15}\frac{1}{15}\frac{1}{15}\frac{1}{15}\frac{1}{15}\frac{1}{15}\frac{1}{15}\frac{1}{15}\frac{1}{15}\frac{1}{15}\frac{1}{15}\frac{1}{15}\frac{1}{15}\frac{1}{15}\frac{1}{15}\right]$$

times the frequency domain region or $$\left[\frac{1}{16}\frac{1}{16}\frac{1}{16}\frac{1}{16}\frac{1}{16}\frac{1}{16}\frac{1}{16}\frac{1}{16}\frac{1}{16}\frac{1}{16}\frac{1}{16}\frac{1}{16}\frac{1}{16}\frac{1}{8}\right]$$

times the frequency domain region.

If the number of frequency domain indication bit resources for the time domain occasion is 16, the frequency domain granularities may be $$\left[\frac{1}{16}\frac{1}{16}\frac{1}{16}\frac{1}{16}\frac{1}{16}\frac{1}{16}\frac{1}{16}\frac{1}{16}\frac{1}{16}\frac{1}{16}\frac{1}{16}\frac{1}{16}\frac{1}{16}\frac{1}{16}\frac{1}{16}\frac{1}{16}\right]$$

times the frequency domain region.

In this embodiment, an order in which the frequency domain region is assigned is not limited. For example, in the case where the number of frequency domain indication bit resources for the time domain occasion is 3 and the frequency domain granularities are $$\left[\frac{1}{4}\frac{1}{4}\frac{1}{2}\right]$$

times the frequency domain region, an order of assignment is not limited to ¼, ¼ and ½ and may be any predefined order. In another embodiment, there may be other methods for dividing frequency domain granularities.

In an embodiment, physical resource units are assigned to first (n−1) frequency domain regions according to a frequency domain region pattern; and remaining physical resource units except the physical resource units assigned to the first (n−1) frequency domain regions within the frequency domain bandwidth are assigned to an n-th frequency domain region. In this embodiment, the first (n−1) frequency domain regions are assigned according to the pattern, where n is the number of time domain units with occupied resources.

In an embodiment, the number of physical resource units of a k-th frequency domain region among the first (n−1) frequency domain regions is a result of rounding up or down a second parameter; where the second parameter is a product of the total number of physical resource units within the frequency domain bandwidth and a frequency domain granularity corresponding to the k-th frequency domain region.

For example, in the case where the frequency domain bandwidth cannot be completely divided into n frequency domain regions by the method in the preceding embodiment, physical resource units of each of the first (n−1) frequency domain regions are determined by a floor method. The physical resource units may be RBs or RBGs. Using the RBs as an example of the physical resource units, RBs of the first (n−1) frequency domain regions are assigned according to the pattern, and the remaining RBs are assigned to the n-th frequency domain region. For example, in the case where the number of frequency domain indication bit resources is 6, the frequency domain granularities are assumed to be $$\left[\frac{1}{8}\frac{1}{8}\frac{1}{4}\frac{1}{4}\frac{1}{8}\frac{1}{8}\right]$$

times the frequency domain region in sequence from a low frequency to a high frequency (or from the high frequency to the low frequency). Assuming that the frequency domain bandwidth is 100 RBs, the number of RBs of a first frequency domain region is $$\left\lfloor\frac{100}{8}\right\rfloor=12,$$

the number of RBs of a second frequency domain region is $$\left\lfloor\frac{100}{8}\right\rfloor=12,$$

the number of RBs of a third frequency domain region is $$\left\lfloor \frac{100}{4} \right\rfloor = 25,$$

the number of RBs of a fourth frequency domain region is $$\left\lfloor \frac{100}{4} \right\rfloor = 25,$$

the number of RBs of a fifth frequency domain region is $$\left\lfloor \frac{100}{8} \right\rfloor = 12,$$

and the number of RBs of a last frequency domain region is 100−12−12−25−25−12=14.

In an embodiment, the physical resource units of each of the first (n−1) frequency domain regions are determined by a ceiling method. For example, in the case where the number of frequency domain indication bit resources is 6, the frequency domain granularities are assumed to be $$\left[ \frac{1}{8} \frac{1}{8} \frac{1}{4} \frac{1}{4} \frac{1}{8} \frac{1}{8} \right]$$

times the frequency domain region in sequence from the low frequency to the high frequency (or from the high frequency to the low frequency). Assuming that the frequency domain bandwidth is 100 RBs, the number of RBs of the first frequency domain region is $$\left\lceil \frac{100}{8} \right\rceil = 13,$$

the number of RBs of the second frequency domain region is $$\left\lceil \frac{100}{8} \right\rceil = 13,$$

the number of RBs of the third frequency domain region is $$\left\lceil \frac{100}{4} \right\rceil = 25,$$

the number of RBs of the fourth frequency domain region is $$\left\lceil \frac{100}{4} \right\rceil = 25,$$

the number of RBs of the fifth frequency domain region is $$\left\lceil \frac{100}{8} \right\rceil = 13,$$

and the number of RBs of the last frequency domain region is 100−13−13−25−25−13=11.

In an embodiment, when preempted frequency domain resources are indicated in a configured time domain resource region, a correspondence exists between a value of a frequency domain resource granularity and the number of bit resources allocated to the time domain occasion.

In an embodiment, at least one of the time domain pattern information, the time domain unit information or the frequency domain resource information is sent through downlink control information (DCI); where the downlink control information includes at least one of: a time domain pattern indicator field, a time domain unit indicator field or a frequency domain resource indicator field.

In this embodiment, the RUR may be one or more RBs or one or more RBGs in the frequency domain and determined through the predefinition or the semi-static configuration. The time domain resource region in the RUR may be one or more slots or one or more symbols and determined through the predefinition or the semi-static configuration. A time domain region contains one or more time domain units which are, for example, the time domain occasions. The time domain occasions divide the time domain region into one or more portions that do not overlap each other. The frequency domain indication bit may be determined for one time domain unit by the methods in the preceding embodiments. In the case where the time domain occasions are used as the time domain units, the pattern of occasion distribution in the RUR, the number of occasions occupied in the RUR, the frequency domain indication bit corresponding to each occupied time domain occasion and the frequency domain granularity of the same bandwidth corresponding to the time domain occasion may be determined. In this embodiment, the DCI contains at least one of the time domain pattern indicator field, the time domain unit indicator field or the frequency domain resource indicator field.

Figure 5:
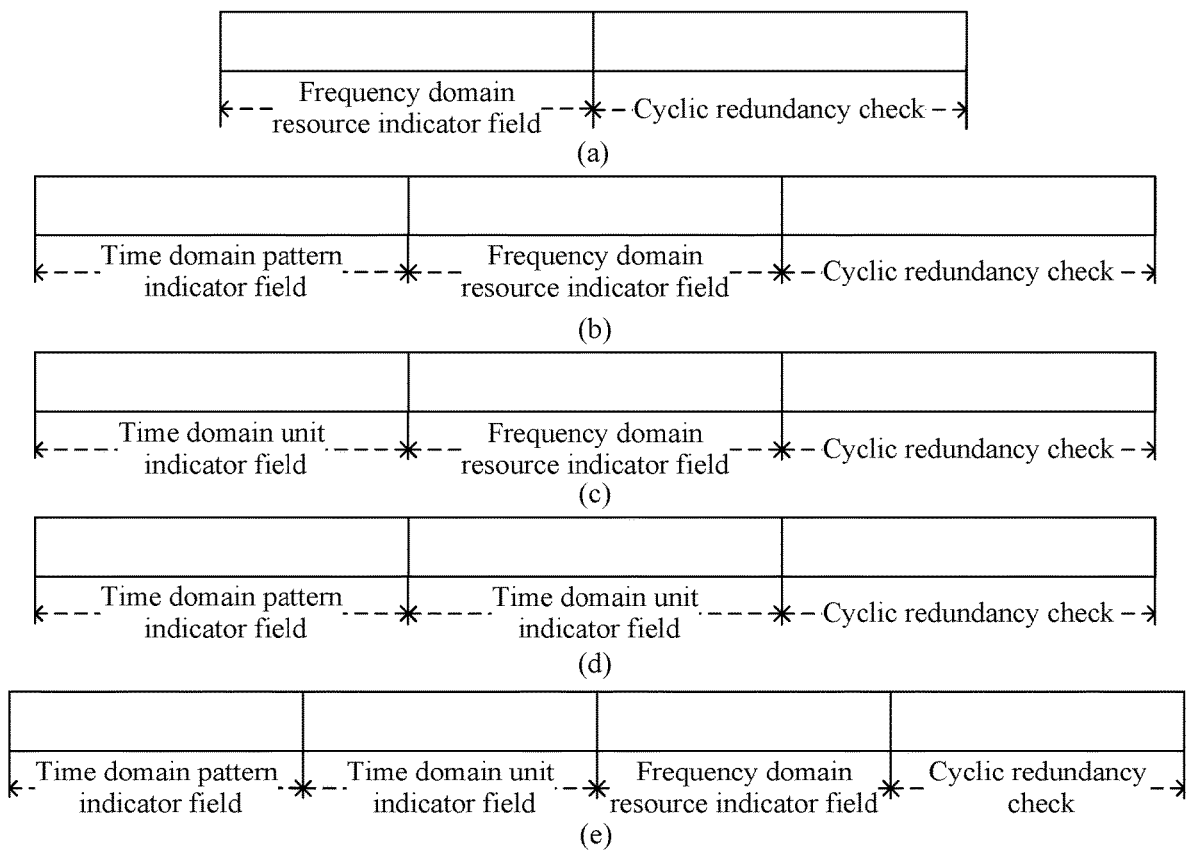
FIG. 5 is a schematic diagram illustrating composition of downlink control information according to an embodiment.

FIG. 5 is a schematic diagram illustrating composition of downlink control information according to an embodiment. In this embodiment, the downlink control information includes one of the cases below.

In the case where the time domain length of the reference uplink resource is equal to the length of the time domain unit, the downlink control information includes the frequency domain resource indicator field, as shown by (a) in FIG. 5.

The downlink control information includes the frequency domain resource indicator field and the time domain pattern indicator field, as shown by (b) in FIG. 5.

The downlink control information includes the frequency domain resource indicator field and the time domain unit indicator field, where the time domain pattern is specified by the protocol or indicated via the higher-layer signaling, as shown by (c) in FIG. 5.

The downlink control information includes the time domain pattern indicator field and the time domain unit indicator field, as shown by (d) in FIG. 5.

The downlink control information includes the frequency domain resource indicator field, the time domain pattern indicator field and the time domain unit indicator field, as shown by (e) in FIG. 5.

In this embodiment, the RUR is the resource indication range and contains at least one time domain unit, and the time domain units do not overlap each other; the time domain pattern is a combination of the at least one time domain unit in the reference uplink resource; and the time domain unit includes at least one time domain occasion or at least one time domain symbol. A sequence of indicator fields or bit information included in the DCI is not limited in this embodiment.

In an embodiment, the time domain pattern indicator field is used for indicating the time domain pattern information, and the time domain pattern information is used for indicating the number of time domain units contained in the reference uplink resource and the time domain length of each of the time domain units.

In an embodiment, the time domain unit indicator field is used for indicating the time domain unit information, the time domain unit information is used for indicating the time domain unit with an occupied resource in the reference uplink resource in the time domain pattern, and the number of bit overheads of the time domain unit indicator field is equal to the total number of time domain units in the time domain pattern.

In an embodiment, the frequency domain resource indicator field is used for indicating frequency domain unit information, the frequency domain resource information is used for indicating the occupied frequency domain unit in each time domain unit with an occupied resource, and the frequency domain resource indicator field includes the third number of frequency domain resource indicator sub-fields, where the third number is equal to the total number of time domain units with occupied resources in the reference uplink resource in the time domain pattern.

In an embodiment, the downlink control information further includes a cyclic redundancy check (CRC) code.

Figure 6:
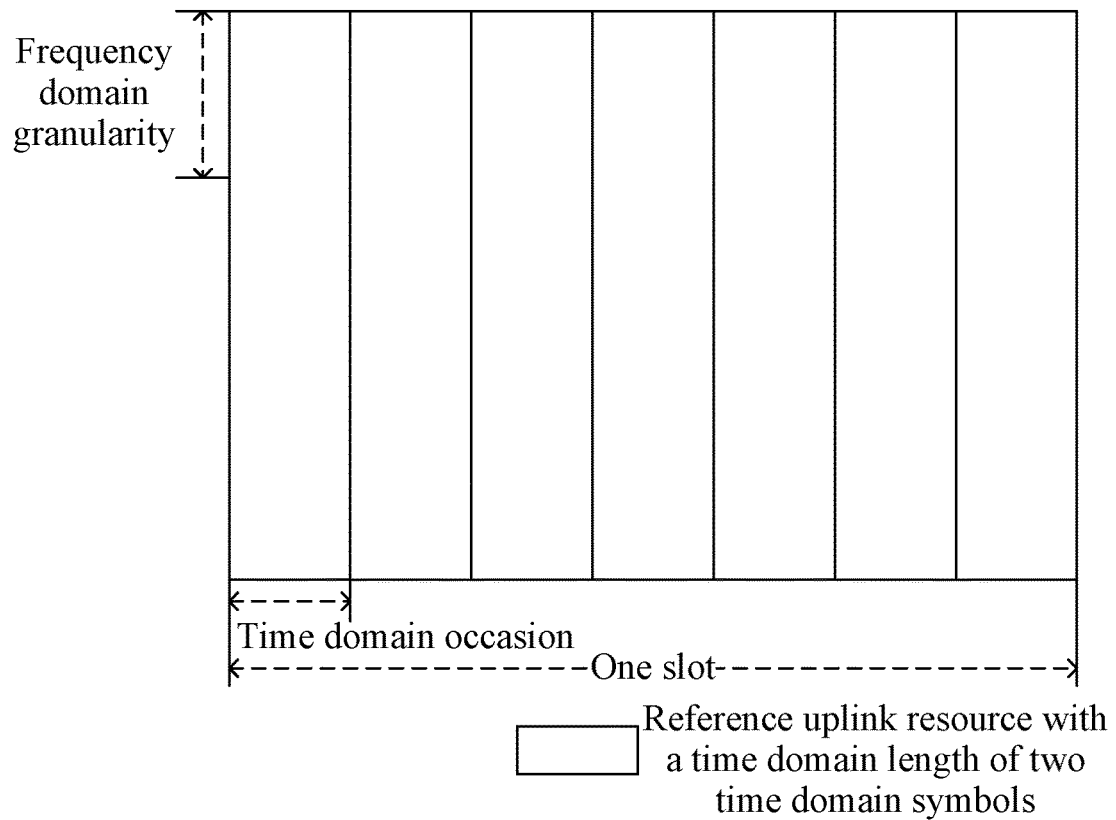
FIG. 6 is a schematic diagram illustrating composition of time and frequency domain resources in one slot according to an embodiment.

FIG. 6 is a schematic diagram illustrating composition of time and frequency domain resources in one slot according to an embodiment. In this embodiment, the downlink control information includes the frequency domain resource indicator field and the CRC, as shown by (a) in FIG. 5. In this embodiment, the length of the RUR is equal to the time domain length of the time domain unit. For example, the length of the RUR is equal to the time domain length of the time domain occasion, or the RUR contains only one time domain symbol. As shown in FIG. 6, one slot includes seven time domain occasions, and the time domain occasion and the RUR both have a length of two symbols. In one slot, the time domain region in the RUR has the same length as the time domain occasion, and the frequency domain granularity is smaller than the frequency domain bandwidth. In this case, the DCI includes only the frequency domain resource indicator field to indicate an occupied frequency domain resource on the time domain occasion.

Figure 7:
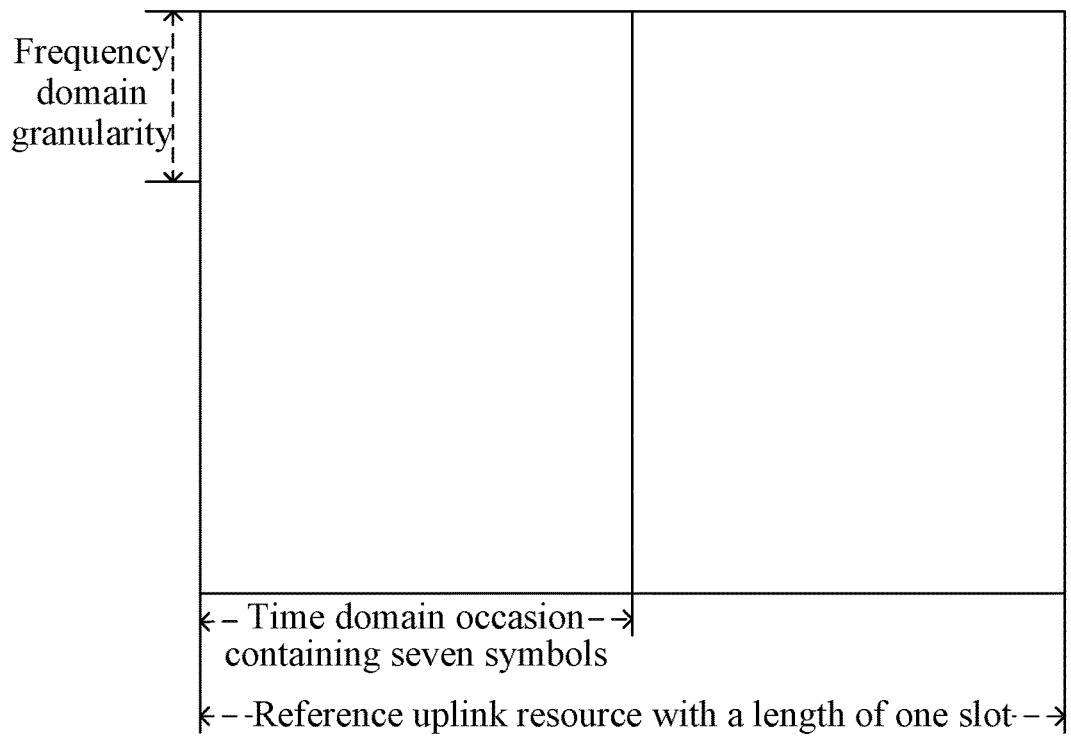
FIG. 7 is a schematic diagram illustrating composition of time and frequency domain resources in one slot according to an embodiment.

FIG. 7 is a schematic diagram illustrating composition of time and frequency domain resources in one slot according to an embodiment. As shown in FIG. 7, the length of the RUR is one slot. As indicated by the time domain pattern indicator field in the DCI, the RUR contains two time domain occasions.

In an embodiment, the downlink control information includes the frequency domain resource indicator field, the time domain pattern indicator field and the CRC, as shown by (b) in FIG. 5. The frequency domain resource indicator field and the time domain pattern indicator field in the DCI indicate the occupied frequency domain resources for each occasion in the RUR. In this case, whether the time domain occasion is occupied depends on whether a bitmap of a frequency domain resource indication corresponding to the occasion is all zero. If the bitmap is all zero, the time domain occasion is not occupied, and if the bitmap is not all zero, the time domain occasion is occupied.

In an embodiment, the downlink control information includes the frequency domain resource indicator field, the time domain unit indicator field and the CRC, as shown by (c) in FIG. 5. The time domain pattern is specified by the protocol or indicated via the higher-layer signaling.

Figure 8:
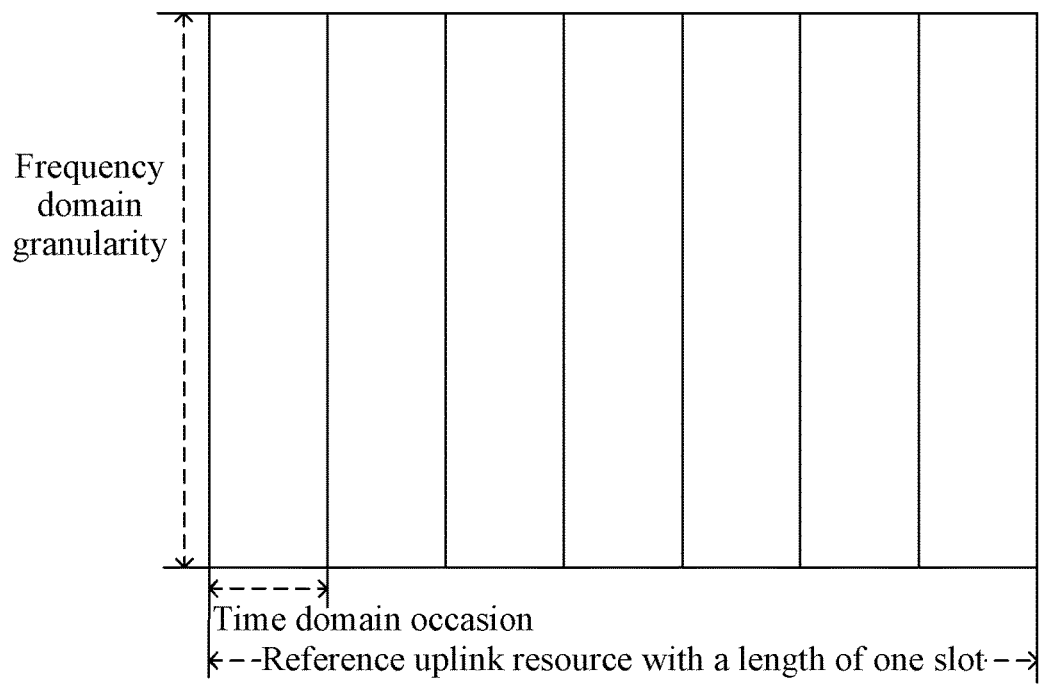
FIG. 8 is a schematic diagram illustrating composition of time and frequency domain resources in one slot according to an embodiment.

FIG. 8 is a schematic diagram illustrating composition of time and frequency domain resources in one slot according to an embodiment. As shown in FIG. 8, the length of the RUR is one slot, and the frequency domain granularity is the entire frequency domain bandwidth by default. As indicated by the time domain pattern indicator field in the DCI, the RUR contains seven time domain occasions. An occupied occasion in the RUR is indicated by the time domain unit indicator field in the DCI. In this embodiment, the DCI includes the time domain pattern indicator field, the time domain unit indicator field and the CRC, as shown by (d) in FIG. 5.

In an embodiment, the DCI includes the frequency domain resource indicator field, the time domain pattern indicator field, the time domain unit indicator field and the CRC, as shown by (e) in FIG. 5. The serving node indicates the time domain pattern by the time domain pattern indicator field, where at least one time domain pattern is predefined by the protocol or configured by the serving node via the higher-layer signaling. On the basis that the pattern is determined, a time domain occasion with an occupied resource in the pattern is indicated by the time domain unit indicator field, and the bit overheads of the time domain unit indicator field are correlated to the time domain pattern. For example, the bit overheads of the time domain unit indicator field are equal to the number of time domain units contained in the RUR with the corresponding time domain pattern. On the basis that the time domain units with occupied resources are determined, an occupied frequency domain resource in each time domain unit with an occupied resource is indicated by the frequency domain resource indicator field. In this embodiment, the frequency domain resource indicator field is divided into one or more frequency domain resource indicator sub-fields according to the time domain unit indicator field, and the number of the frequency domain resource indicator sub-fields is equal to the number of occasions with occupied resources in the RUR.

In an embodiment, the first resource indication information includes the time domain pattern information and the frequency domain unit information.

The total number of bit resources for indicating resource indication information is determined according to the number of candidate time domain patterns and a frequency domain indication resource corresponding to each time domain unit under each candidate time domain pattern.

In an embodiment, the number of bits for indicating the resource indication information under one candidate time domain pattern is a sum of a third parameter and a fourth parameter; where the third parameter is the number of bits required for indicating a time domain pattern of occupied time and frequency domain resources and determined according to the number of candidate time domain patterns, and the fourth parameter is a total number of bits of frequency domain indication resources corresponding to time domain units under the one candidate time domain pattern. The total number of bit resources for indicating the resource indication information is equal to a maximum bit number among numbers of bits for indicating the resource indication information corresponding to the candidate time domain patterns.

In this embodiment, the RUR is optionally one or more RBs or one or more RBGs in the frequency domain and determined through the predefinition or the semi-static configuration. The time domain resource region in the RUR is optionally one or more slots or one or more time domain symbols and determined through the predefinition or the semi-static configuration. The time domain region includes one or more time domain occasions, and the time domain occasions divide the time domain region into one or more portions that do not overlap each other. With the occasion as the time domain unit, in the preceding embodiments, the pattern of occasion distribution in the RUR may be determined, the occasion actually occupied in the time domain pattern is determined, and the frequency domain resource corresponding to each occupied occasion is determined by a predefinition method (for example, occupied RBGs are indicated by the bitmap).

Figure 9:
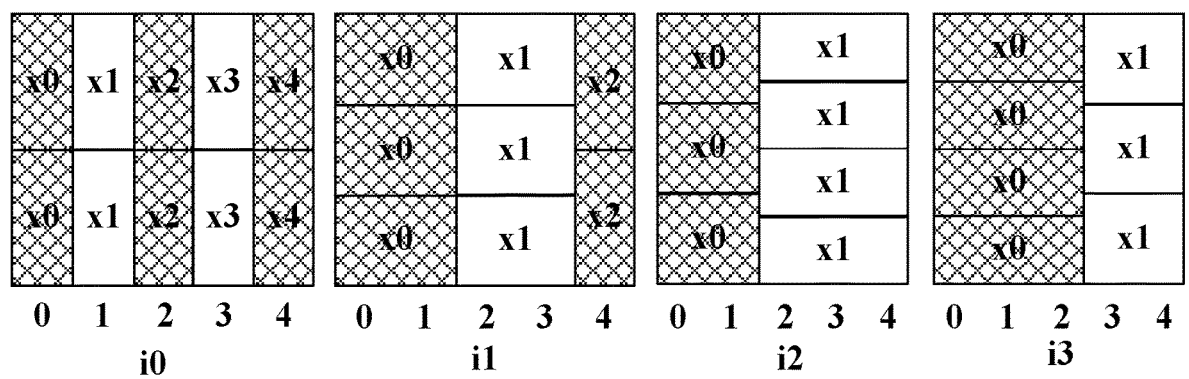
FIG. 9 is a schematic diagram of frequency domain bitmaps corresponding to time domain patterns according to an embodiment.

FIG. 9 is a schematic diagram of frequency domain bitmaps corresponding to time domain patterns according to an embodiment. In this embodiment, q0 bit resources are required for determining the time domain pattern of the RUR and q1 bit resources are required for determining the number of occasions occupied in the RUR. For example, candidate time domain patterns are shown in FIG. 4, and the number of candidate patterns is 4. Pattern i0 contains five occasions, pattern i1 contains three occasions, pattern i2 contains two occasions, and pattern i3 contains two occasions. As shown in FIG. 9, for each time domain pattern, a size of a frequency domain bitmap is determined according to a length of an occasion. Pattern i0 contains five occasions, where bitmaps of the five occasions all have a size of 2 and are x0x0, x1x1, x2x2, x3x3 and x4x4 in sequence. Pattern i1 contains three occasions, where a bitmap of a first occasion has a size of 3, a bitmap of a second occasion has a size of 3, a bitmap of a third occasion has a size of 2, and the bitmaps are x0x0x0, x1x1x1 and x2x2 in sequence. Pattern i2 contains two occasions, where a bitmap of a first occasion has a size of 3, a bitmap of a second occasion has a size of 4, and the bitmaps are x0x0x0 and x1x1x1x1 in sequence. Pattern i3 contains two occasions, where a bitmap of a first occasion has a size of 4, a bitmap of a second occasion has a size of 3, and the bitmaps are x0x0x0x0 and x1x1x1 in sequence. A total overhead under each pattern is calculated: $Q_{i0}=\lceil \log_2 4 \rceil+5+5*2=17$, where the third parameter is $\lceil \log_2 4 \rceil=2$ and the fourth parameter is $5+5*2=15$; $Q_{i1}=\lceil \log_2 4 \rceil+3+3*2+2*1=13$, where the third parameter is $\lceil \log_2 4 \rceil=2$ and the fourth parameter is $3+3*2+2*1=11$; $Q_{i2}=\lceil \log_2 4 \rceil+2+3*1+4*1=11$, where the third parameter is $\lceil \log_2 4 \rceil=2$ and the fourth parameter is $2+3*1+4*1=9$; $Q_{i3}=\lceil \log_2 4 \rceil+2+4*1+3*1=11$, where the third parameter is $\lceil \log_2 4 \rceil=2$ and the fourth parameter is $2+4*1+3*1=9$. Then, the number of bits indicating the resource indication information, that is, a size of the DCI for indicating occupied time and frequency resources is a maximum value of the preceding four values: $Q=\max(Q_{i0},Q_{i1},Q_{i2},Q_{i3})=17$.

According to the resource indication method in this embodiment, the first resource indication information is sent to the user terminal and the uplink data transmission mechanism is indicated to the user terminal so that the resource preemption information is effectively and accurately indicated to the terminal whose transmission is cancelled, thereby refining the dimension of the resource indication and improving the efficiency and reliability of the resource indication.

Figure 10:
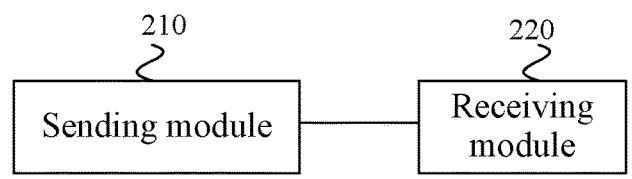
FIG. 10 is a structure diagram of a resource indication apparatus according to an embodiment.

An embodiment of the present application further provides a resource indication apparatus. FIG. 10 is a structure diagram of a resource indication apparatus according to an embodiment. As shown in FIG. 10, the apparatus includes a sending module 210 and a receiving module 220.

The sending module 210 is configured to send resource indication information of occupied time and frequency domain resources to a user terminal.

The receiving module 220 is configured to receive uplink transmission data sent by the user terminal according to the resource indication information.

In an embodiment, first resource indication information contains at least one of time domain pattern information, time domain unit information or frequency domain resource information.

In an embodiment, the time domain pattern information is used for indicating the number of time domain units contained in a reference uplink resource and a time domain length of each of the time domain units.

The reference uplink resource is a resource indication range and contains at least one time domain unit, and time domain units do not overlap each other; a time domain pattern is a combination of the at least one time domain unit in the reference uplink resource; and each of the at least one time domain unit includes at least one time domain occasion or at least one time domain symbol.

In an embodiment, the time domain pattern information is indicated in at least one of manners described below.

The time domain pattern information is implicitly indicated by a time domain length of the reference uplink resource, where the time domain length of the reference uplink resource has a mapping relationship with the time domain pattern information, the mapping relationship is predefined by a protocol, and the time domain length of the reference uplink resource is sent to the user terminal via higher-layer signaling.

The time domain pattern information is indicated via higher-layer signaling, where the time domain pattern information includes an index of a time domain pattern, candidate time domain patterns and indexes of the candidate time domain patterns are predefined by a protocol, and the number of bits indicating the index of the time domain pattern is determined according to the number of the candidate time domain patterns.

The time domain pattern information is indicated via higher-layer signaling, where the time domain pattern information is configured via the higher-layer signaling.

The time domain pattern information is sent via physical layer signaling, where the time domain pattern information includes an index of a time domain pattern, the index of the time domain pattern is predefined by a protocol, and the number of bits indicating the index of the time domain pattern is determined according to the number of candidate time domain patterns.

The time domain pattern information is indicated via physical layer signaling, where the time domain pattern information includes an index of one time domain pattern of a first number of time domain patterns, the first number of time domain patterns are configured via higher-layer signaling, and the number of bits indicating the index of the one time domain pattern is determined according to the first number.

The time domain pattern information is indicated via physical layer signaling, where the time domain pattern information includes an index of one time domain pattern of a second number of time domain patterns, the second number of time domain patterns are selected via higher-layer signaling from candidate time domain patterns whose indexes are predefined by a protocol, and the number of bits indicating the index of the one time domain pattern is determined according to the second number.

In an embodiment, the time domain unit information is used for indicating a time domain unit with an occupied resource in the reference uplink resource in the time domain pattern, and the number of bits of the time domain unit information is equal to the total number of time domain units in the time domain pattern.

The reference uplink resource is the resource indication range and contains at least one time domain unit, and the time domain units do not overlap each other; the time domain pattern is a combination of the at least one time domain unit in the reference uplink resource; and each of the at least one time domain unit includes at least one time domain occasion or at least one time domain symbol.

In an embodiment, the time domain unit information is indicated in a manner described below.

The time domain unit information is indicated by a bitmap, where the time domain unit information includes an occupancy state of each of the time domain units in the reference uplink resource in the time domain pattern, the occupancy state includes occupied and available, and the bitmap is sent to the user terminal via the physical layer signaling.

In an embodiment, the frequency domain resource information is used for indicating an occupied frequency domain unit in each time domain unit with an occupied resource and includes a third number of pieces of indication sub-information, where the third number is equal to the total number of time domain units with occupied resources in the reference uplink resource in the time domain pattern.

The third number n is a positive integer; the reference uplink resource is the resource indication range and contains at least one time domain unit, and the time domain units do not overlap each other; the time domain pattern is a combination of the at least one time domain unit in the reference uplink resource; and each of the at least one time domain unit includes at least one time domain occasion or at least one time domain symbol.

In an embodiment, the number of frequency domain indication bits for indicating the frequency domain unit is determined according to the total number of bit resources for indicating time and frequency domain resource information, the number of bit resources for indicating the time domain pattern and the number of bit resources for indicating the time domain units, where the total number of bit resources for indicating time domain resource information is pre-defined by the protocol, configured via the higher-layer signaling or indicated via the physical layer signaling.

The total number of bit resources for indicating time and frequency domain resource information is a sum of the number of frequency domain indication bits, the number of bit resources for indicating the time domain pattern and the number of bit resources for indicating the time domain units.

In an embodiment, the apparatus further includes a first allocation module.

The first allocation module is configured to allocate bit resources for indicating frequency domain units to the time domain units according to a principle of equal allocation.

In an embodiment, the first allocation module is configured to perform operations described below.

In the case where the number of frequency domain indication bits is an integer multiple of n, the number of frequency domain indication bits allocated to each of the time domain units is a ratio of the number of frequency domain indication bits to n.

In the case where the number of frequency domain indication bits is not an integer multiple of n, first bit resources are allocated to each of the time domain units, where the number of the first bit resources is a result of rounding down the ratio of the number of frequency domain indication bits to n, and remaining bit resources of the bit resources for indicating frequency domain units are allocated to the time domain units one by one until zero bit resources remain.

The time domain units are arranged in a first order or a second order, the first order is a chronological order of the time domain units, the second order is a descending order of time domain lengths of the time domain units, when two or more time domain units of the time domain units have the same time domain length, the two or more time domain units are arranged in the chronological order.

In an embodiment, the resource indication apparatus further includes a second allocation module.

The second allocation module is configured to allocate the bit resources for indicating frequency domain units to the time domain units according to a principle that a time domain length of a time domain unit is positively correlated to the number of bits.

In an embodiment, the second allocation module is configured to perform an operation described below.

The bit resources for indicating frequency domain units are cyclically allocated to the time domain units one by one until zero bit resources remain.

The time domain units are arranged in the second order, the second order is the descending order of the time domain lengths of the time domain units, when two or more the time domain units of the time domain units have the same time domain length, the two or more time domain units are arranged in the chronological order.

In an embodiment, the second allocation module is configured to perform operations described below.

Second bit resources are allocated to each of the time domain units, where the number of second bit resources allocated to an i-th time domain unit is a result of rounding down a product of the number of frequency domain indication bits and a first parameter.

Remaining bit resources of the bit resources for indicating frequency domain units are allocated to the time domain units one by one.

The first parameter is a ratio of $l_i$ to L, where $l_i$ denotes a time domain length of the i-th time domain unit, and L denotes a total time domain length of the reference uplink resource or a total time domain length of the time domain units with occupied resources.

The time domain units are arranged in the second order, the second order is the descending order of the time domain lengths of the time domain units, when two or more the time domain units of the time domain units have the same length, the two or more time domain units are arranged in the chronological order.

In an embodiment, the apparatus further includes a third allocation module.

The third allocation module is configured to allocate the bit resources for indicating frequency domain units to target time domain units, where the target time domain units include first m time domain units of the time domain units, m is a threshold of the number of time domain units, and the number of bit resources corresponding to a remaining time domain unit of the time domain units except the first m time domain units is 0.

In an embodiment, the time domain units are arranged in the first order which is the chronological order of the time domain units.

Occupancy states of all frequency domain units corresponding to the remaining time domain unit are specified by the protocol, configured via the higher-layer signaling, or configured via the physical layer signaling, where each of the occupancy states includes occupied and available.

In an embodiment, the time domain units are arranged in the second order, the second order is the descending order of the time domain lengths of the time domain units, when two or more the time domain units of the time domain units have the same time domain length, the two or more time domain units are arranged in the chronological order.

The occupancy states of all the frequency domain units corresponding to the remaining time domain unit are specified by the protocol, configured via the higher-layer signaling, or configured via the physical layer signaling, where each of the occupancy states includes occupied.

In an embodiment, the resource indication apparatus further includes an assignment module.

The assignment module is configured to assign a frequency domain region according to the number of frequency domain indication bit resources for each of the time domain units.

In an embodiment, the assignment module is configured to perform an operation described below.

A frequency domain granularity of the same bandwidth corresponding to each of the time domain units is determined, where the frequency domain granularity is used for assigning the frequency domain region, and all frequency domain granularities corresponding to the time domain units are combined into a frequency domain region pattern.

In an embodiment, a frequency domain granularity of the same bandwidth corresponding to the i-th time domain unit is $$\frac{1}{q_i}$$

times the frequency domain region, where $q_i$ is used for indicating the number of bit resources for the i-th time domain unit.

Alternatively, a frequency domain granularity of the same bandwidth corresponding to the i-th time domain unit is an integer power of ½ times the frequency domain region.

In an embodiment, the assignment module is configured to perform operations described below.

Physical resource units are assigned to first (n−1) frequency domain regions according to the frequency domain region pattern.

Remaining physical resource units except the physical resource units assigned to the first (n−1) frequency domain regions within a frequency domain bandwidth are assigned to an n-th frequency domain region.

In an embodiment, the number of physical resource units of a k-th frequency domain region among the first (n−1) frequency domain regions is a result of rounding up or down a second parameter.

The second parameter is a product of the total number of physical resource units within the frequency domain bandwidth and a frequency domain granularity corresponding to the k-th frequency domain region.

In an embodiment, at least one of the time domain pattern information, the time domain unit information or the frequency domain resource information is sent through downlink control information.

The downlink control information includes at least one of: a time domain pattern indicator field, a time domain unit indicator field or a frequency domain resource indicator field.

In an embodiment, the downlink control information includes one of the cases below.

In the case where the time domain length of the reference uplink resource is equal to a length of the time domain unit, the downlink control information includes the frequency domain resource indicator field.

The downlink control information includes the frequency domain resource indicator field and the time domain pattern indicator field.

The downlink control information includes the frequency domain resource indicator field and the time domain unit indicator field, where the time domain pattern is specified by the protocol or indicated via the higher-layer signaling.

The downlink control information includes the time domain pattern indicator field and the time domain unit indicator field.

The downlink control information includes the frequency domain resource indicator field, the time domain pattern indicator field and the time domain unit indicator field.

The reference uplink resource is the resource indication range and contains at least one time domain unit, and the time domain units do not overlap each other; the time domain pattern is a combination of the at least one time domain unit in the reference uplink resource; and each of the at least one time domain unit includes at least one time domain occasion or at least one time domain symbol.

In an embodiment, the time domain pattern indicator field is used for indicating the time domain pattern information, and the time domain pattern information is used for indicating the number of time domain units contained in the reference uplink resource and the time domain length of each of the time domain units.

The time domain unit indicator field is used for indicating the time domain unit information, the time domain unit information is used for indicating the time domain unit with an occupied resource in the reference uplink resource in the time domain pattern, and the number of bit overheads of the time domain unit indicator field is equal to the total number of time domain units in the time domain pattern.

The frequency domain resource indicator field is used for indicating frequency domain unit information, the frequency domain resource information is used for indicating the occupied frequency domain unit in each time domain unit with an occupied resource, and the frequency domain resource indicator field includes the third number of frequency domain resource indicator sub-fields, where the third number is equal to the total number of time domain units with occupied resources in the reference uplink resource in the time domain pattern.

In an embodiment, the downlink control information further includes a cyclic redundancy check code.

In an embodiment, the first resource indication information includes the time domain pattern information and the frequency domain unit information.

The total number of bit resources for indicating resource indication information is determined according to the number of candidate time domain patterns and a frequency domain indication resource corresponding to each time domain unit under each candidate time domain pattern.

In an embodiment, the number of bits for indicating the resource indication information under one candidate time domain pattern is a sum of a third parameter and a fourth parameter.

The third parameter is the number of bits required for indicating a time domain pattern of occupied time and frequency domain resources and determined according to the number of candidate time domain patterns.

The fourth parameter is the total number of bits of frequency domain indication resources corresponding to time domain units under the one candidate time domain pattern.

The total number of bit resources for indicating the resource indication information is equal to a maximum bit number among numbers of bits for indicating the resource indication information corresponding to the candidate time domain patterns.

For technical details of the resource indication apparatus provided in this embodiment that are not described in detail in this embodiment, see any one of the preceding embodiments of the resource indication method provided in the preceding embodiments, and this embodiment has the same beneficial effects as the resource indication method executed.

An embodiment of the present application further provides a serving node. The resource indication method may be performed by the resource indication apparatus which may be implemented by software and/or hardware and integrated in the serving node.

Figure 11:
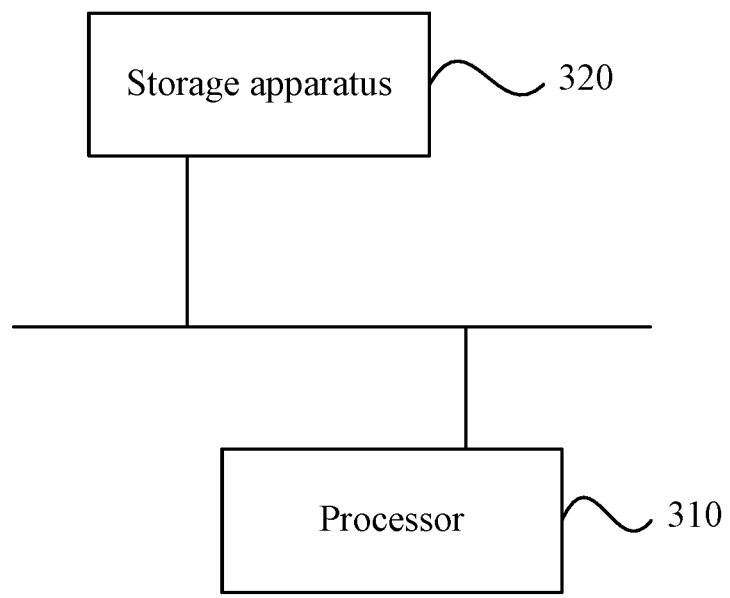
FIG. 11 is a structure diagram of a serving node according to an embodiment.

FIG. 11 is a structure diagram of a serving node according to an embodiment. As shown in FIG. 11, the serving node provided in this embodiment includes a processor 310 and a storage apparatus 320. The serving node may include one or more processors. One processor 310 is shown as an example in FIG. 11. The processor 310 and the storage apparatus 320 in the serving node may be connected via a bus or in other manners. The connection via the bus is shown as an example in FIG. 11.

One or more programs are executed by one or more processors 310 to cause the one or more processors to implement the resource indication methods in any one of the preceding embodiments.

The storage apparatus 320 in the serving node, as a computer-readable storage medium, may be configured to store one or more programs which may be software programs, computer-executable programs and modules, such as program instructions/modules (for example, modules in the resource indication apparatus, which include a sending module 210 and a receiving module 220, as shown in FIG. 10) corresponding to the resource indication method in embodiments of the present disclosure. The processor 310 executes software programs, instructions and modules stored in the storage apparatus 320 to perform various function applications and data processing of the serving node, that is, to implement the resource indication method in the preceding method embodiments.

The storage apparatus 320 mainly includes a program storage region and a data storage region. The program storage region may store an operating system and an application program required by at least one function. The data storage region may store data (such as first resource indication information and time domain pattern information in the preceding embodiments) created based on use of the serving node. Additionally, the storage apparatus 320 may include a high-speed random-access memory and may further include a nonvolatile memory such as at least one dick memory, a flash memory or another nonvolatile solid-state memory. In some examples, the storage apparatus 320 may include memories which are remotely disposed relative to the processor 310 and these remote memories may be connected to the serving node via a network. Examples of the preceding network include, but are not limited to, the Internet, an intranet, a local area network, a mobile communication network and a combination thereof.

In the case where the one or more programs are executed by the one or more processors 310, which are included in the serving node, the following operations are implemented: sending first resource indication information to a user terminal, where the first resource indication information is used for indicating an uplink data transmission mechanism to the user terminal; and receiving uplink data sent by the user terminal.

For technical details of the serving node provided in this embodiment that are not described in detail in this embodiment, see any one of the preceding embodiments of the resource indication method provided in the preceding embodiments, and this embodiment has the same beneficial effects as the resource indication method executed.

An embodiment of the present application further provides a storage medium including a computer-executable instruction executed by a processor in a computer for performing a resource indication method. The method includes: sending first resource indication information to a user terminal, where the first resource indication information is used for indicating an uplink data transmission mechanism to the user terminal; and receiving uplink data sent by the user terminal.

From the preceding description of embodiments, it is to be understood by those skilled in the art that the present application may be implemented by use of software and general-purpose hardware or may be implemented by hardware. Based on this understanding, the technical solutions of the present application may be embodied in the form of a software product. The software product in a computer may be stored in a computer-readable storage medium such as a floppy disk, read-only memory (ROM), random-access memory (RAM), flash memory, hard disk or optical disk in the computer and includes multiple instructions for enabling a computer device (which may be a personal computer, a server or a network device) to perform the method in any embodiment of the present application.

The above are only example embodiments of the present application and are not intended to limit the scope of the present application.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable for a local technical environment and may be implemented using any suitable data storage technology. The memory may be, for example, but not limited to, a read-only memory (ROM), a random-access memory (RAM), an optical storage apparatus and system (digital video disc (DVD) or compact disc (CD)) or the like. Computer-readable media may include non-transitory storage media. Data processors may be of any type suitable for the local technical environment and may be, for example, but not limited to, a general-purpose computer, a special-purpose computer, a microprocessor, a digital signal processor (DSP), an application-specific integrated circuit (ASIC), a field programmable gate array (FPGA) and a processor based on multi-core processor architecture.

What is claimed is:
1. A resource indication method, comprising:
  sending first resource indication information to a user terminal, wherein the first resource indication information is used for indicating an uplink data transmission mechanism to the user terminal; and
  receiving uplink data sent by the user terminal, wherein the first resource indication information contains:
time domain unit information and frequency domain resource information;
wherein the time domain unit information is used for indicating a time domain unit in a reference uplink resource in a time domain pattern, and a number of bits of the time domain unit information is equal to a total number of time domain units in the time domain pattern;
wherein the reference uplink resource is a resource indication range and contains at least one time domain unit, and in response to the at least one time domain unit comprises a plurality of time domain units, the plurality of time domain units do not overlap each other; the time domain pattern is a combination of the at least one time domain unit in the reference uplink resource; and each of the at least one time domain unit comprises at least one time domain occasion or at least one time domain symbol;
wherein the frequency domain resource information is used for indicating an occupied frequency domain unit in each time domain unit; and
wherein the time domain unit information is indicated in the following manner:
the time domain unit information is indicated by a bitmap, wherein the time domain unit information comprises an occupancy state of each of the at least one time domain unit in the reference uplink resource in the time domain pattern, the occupancy state comprises occupied and available, and the bitmap is sent to the user terminal via physical layer signaling.

2. The method of claim 1, wherein the first resource indication information further contains time domain pattern information.

3. The method of claim 1, wherein
the time domain pattern information is used for indicating a number of time domain units contained in a reference uplink resource and a time domain length of each of the time domain units.

4. The method of claim 1, wherein
a number of frequency domain indication bits for indicating the frequency domain unit is determined according to a total number of bit resources for indicating time and frequency domain resource information, a number of bit resources for indicating the time domain pattern and a number of bit resources for indicating the at least one time domain unit, wherein the total number of bit resources for indicating time and frequency domain resource information is predefined by a protocol, configured via higher-layer signaling or indicated via physical layer signaling; and
the total number of bit resources for indicating time and frequency domain resource information is a sum of the number of frequency domain indication bits, the number of bit resources for indicating the time domain pattern and the number of bit resources for indicating the at least one time domain unit.

5. The method of claim 4, further comprising:
allocating bit resources for indicating frequency domain units to the time domain units according to a principle of equal allocation.

6. The method of claim 4, further comprising:
allocating bit resources for indicating frequency domain units to the time domain units according to a principle that a time domain length of a time domain unit is positively correlated to a number of bits.

7. The method of claim 4, further comprising:
allocating bit resources for indicating frequency domain units to target time domain units, wherein the target time domain units comprise first m time domain units of the time domain units, m is a threshold of a number of time domain units, and a number of bit resources corresponding to a remaining time domain unit of the time domain units except the first m time domain units is 0.

8. The method of claim 4, further comprising:
dividing a frequency domain region according to a number of frequency domain indication bit resources for each of the time domain units.

9. The method of claim 2, wherein at least one of the time domain pattern information, the time domain unit information or the frequency domain resource information is sent through downlink control information;
wherein the downlink control information comprises at least one of:
a time domain pattern indicator field, a time domain unit indicator field or a frequency domain resource indicator field.

10. The method of claim 9, wherein the downlink control information comprises one of the following:
in response to a time domain length of a reference uplink resource is equal to a time domain length of a time domain unit, the downlink control information comprises the frequency domain resource indicator field;
the downlink control information comprises the frequency domain resource indicator field and the time domain pattern indicator field;
the downlink control information comprises the frequency domain resource indicator field and the time domain unit indicator field, wherein a time domain pattern is specified by a protocol or indicated via higher-layer signaling;
the downlink control information comprises the time domain pattern indicator field and the time domain unit indicator field;
the downlink control information comprises the frequency domain resource indicator field, the time domain pattern indicator field and the time domain unit indicator field.

11. The method of claim 10, wherein
the time domain pattern indicator field is used for indicating the time domain pattern information, and the time domain pattern information is used for indicating a number of time domain units contained in the reference uplink resource and a time domain length of each of the time domain units;
the time domain unit indicator field is used for indicating the time domain unit information, the time domain unit information is used for indicating a time domain unit with an occupied resource in the reference uplink resource in the time domain pattern, and a number of bit overheads of the time domain unit indicator field is equal to a total number of time domain units in the time domain pattern; and
the frequency domain resource indicator field is used for indicating frequency domain unit information, the frequency domain resource information is used for indicating an occupied frequency domain unit in each time domain unit with an occupied resource, and the frequency domain resource indicator field comprises a third number of frequency domain resource indicator sub-fields, wherein the third number is equal to a total number of time domain units with occupied resources in the reference uplink resource in the time domain pattern.

12. The method of claim 9, wherein the downlink control information further comprises a cyclic redundancy check code.

13. The method of claim 2, wherein the first resource indication information further comprises frequency domain unit information; and
a total number of bit resources for indicating resource indication information is determined according to a number of candidate time domain patterns and a frequency domain indication resource corresponding to each time domain unit under each candidate time domain pattern.

14. The method of claim 13, wherein
a number of bits for indicating the resource indication information under one candidate time domain pattern is a sum of a third parameter and a fourth parameter;
wherein the third parameter is a number of bits indicating a time domain pattern of occupied time and frequency domain resources and determined according to the number of candidate time domain patterns, and the fourth parameter is a total number of bits of frequency domain indication resources corresponding to time domain units under the one candidate time domain pattern; and
the total number of bit resources for indicating the resource indication information is equal to a maximum bit number among numbers of bits for indicating the resource indication information corresponding to a plurality of candidate time domain patterns.

15. A serving node, comprising:
one or more processors; and
a storage apparatus, which is configured to store one or more programs;
wherein the one or more programs are executed by the one or more processors to cause the one or more processors to implement the resource indication method of claim 1.

16. A non-transitory computer-readable storage medium, which is configured to store a computer program which, when executed by a processor, implements the resource indication method of claim 1.

* * * * *